United States Patent
Okamatsu

(10) Patent No.: US 9,803,118 B2
(45) Date of Patent: Oct. 31, 2017

(54) COAGULANT AND TIRE PUNCTURE REPAIR KIT USING SAME

(71) Applicant: THE YOKOHAMA RUBBER CO., LTD., Minato-ku, Tokyo (JP)

(72) Inventor: Takahiro Okamatsu, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 14/917,481

(22) PCT Filed: Aug. 21, 2014

(86) PCT No.: PCT/JP2014/071936
§ 371 (c)(1),
(2) Date: Mar. 8, 2016

(87) PCT Pub. No.: WO2015/033796
PCT Pub. Date: Mar. 12, 2015

(65) Prior Publication Data
US 2016/0215187 A1    Jul. 28, 2016

(30) Foreign Application Priority Data

Sep. 9, 2013    (JP) .................. 2013-186452

(51) Int. Cl.
*B29C 73/16*    (2006.01)
*C09K 3/12*    (2006.01)
*C08L 5/06*    (2006.01)

(52) U.S. Cl.
CPC .............. *C09K 3/12* (2013.01); *B29C 73/163* (2013.01); *C08L 5/06* (2013.01)

(58) Field of Classification Search
CPC .......... B29C 73/16; B29C 73/163; C09K 3/12
USPC ........................................... 523/166
See application file for complete search history.

(56) References Cited

U.S. PATENT DOCUMENTS

2009/0023837 A1*  1/2009  Okamatsu ............. B29C 73/163
                                                                    523/166
2011/0027394 A1*  2/2011  McClements ........ A23D 7/0053
                                                                    424/722

FOREIGN PATENT DOCUMENTS

JP    2002363331    12/2002
JP    2009041006    2/2009

* cited by examiner

*Primary Examiner* — Edward Cain
(74) *Attorney, Agent, or Firm* — Carrier Blackman & Associates, P.C.; Joseph P. Carrier; Anne G. Sabourin

(57) ABSTRACT

An object of the present invention is to provide a coagulant with excellent coagulability performance, and a tire puncture repair kit that uses the coagulant. The present invention is a coagulant of a tire puncture repair liquid, the coagulant including at least one component selected from the group consisting of a plant protein, a pectin, a cellulose, a phospholipid and a fatty acid glyceride, and a tire puncture repair kit that uses the coagulant.

14 Claims, No Drawings

COAGULANT AND TIRE PUNCTURE REPAIR KIT USING SAME

TECHNICAL FIELD

The present invention relates to a coagulant and a tire puncture repair kit that uses the coagulant.

BACKGROUND ART

To-date, it has been possible for a general user to temporarily repair a tire puncture using a tire puncture repair liquid. However, since tire puncture repair liquid generally includes an anti-freezing agent such as ethylene glycol, it is not possible to dispose of tire puncture repair liquid recovered after tire puncture repair without change. Therefore, a coagulant that is capable of coagulating a tire puncture repair liquid has been suggested (for example, Patent Document 1).

CITATION LIST

Patent Literature

Patent Document 1: Japanese Unexamined Patent Application Publication No. 2009-41006A

SUMMARY OF INVENTION

Technical Problem

Currently, the development of new coagulants for tire puncture repair liquid is anticipated in order to improve coagulability performance, reduce weight, decrease costs and the like.

Thus, an object of the present invention is to provide a novel coagulant.

Solution to Problem

Following extensive investigation into the above-mentioned problem and the examination of various materials, the inventors of the present application discovered that a coagulant that contains at least one substance selected from the group consisting of a plant protein, a pectin, a cellulose, a phospholipid and a fatty acid triglyceride has similar or greater coagulability performance of a tire puncture repair liquid to conventional coagulants. In addition, the inventors achieved the present invention by discovering that a coagulant that contains a plant protein, a pectin, a cellulose and a fatty acid triglyceride at a specified quantitative ratio has similar or greater coagulability performance of a tire puncture repair liquid to conventional coagulants.

That is, the present invention provides the following coagulant and a tire puncture repair kit that uses the coagulant.

1. A coagulant of a tire puncture repair liquid, the coagulant comprising at least one component selected from the group consisting of a plant protein, a pectin, a cellulose, a phospholipid and a fatty acid glyceride, a quantity of the components per 100 parts by mass of the tire puncture repair liquid is 16 parts by mass or more.

2. A coagulant of a tire puncture repair liquid, the coagulant comprising a plant protein, a pectin, a cellulose, and a fatty acid glyceride, a mass ratio of the plant protein:the pectin:cellulose:the fatty acid glyceride being 10 to 25:30 to 50:25 to 35:5 to 15, and a total quantity of the plant protein, the pectin, the cellulose and the fatty acid glyceride per 100 parts by mass of the tire puncture repair liquid being 8 parts by mass or more.

3. The coagulant according to 2, further comprising a phospholipid.

4. The coagulant according to any one of 1 to 3, in which the fatty acid glyceride is a fatty acid triglyceride.

5. The coagulant according to any one of 1 to 4, further comprising at least one metal salt selected from the group consisting of aluminum sulfate, calcium chloride, magnesium chloride and sodium chloride.

6. The coagulant according to 5, in which a quantity of the metal salts is 5 to 20 mass % of the total quantity of the coagulant.

7. The coagulant according to any one of 1 to 6, in which the tire puncture repair liquid contains at least one selected from the group consisting of a natural rubber latex and an ethylene-vinyl acetate copolymer emulsion, and an anti-freezing agent.

8. The coagulant according to 7, in which the anti-freezing agent is at least one substance selected from the group consisting of ethylene glycol, propylene glycol, diethylene glycol and glycerin.

9. A tire puncture repair kit comprising a tire puncture repair liquid and the coagulant described in any one of 1 to 8.

Advantageous Effects of Invention

The coagulant and the tire puncture repair kit of the present invention have excellent coagulability performance.

DESCRIPTION OF EMBODIMENTS

The present invention is described in detail below.

Firstly, the coagulant of the present invention will be described below.

The coagulant (a coagulant of a first aspect of the present invention) of the present invention is a coagulant of a tire puncture repair liquid, the coagulant including at least one component selected from the group consisting of a plant protein, a pectin, a cellulose, a phospholipid and a fatty acid glyceride, in which a quantity of the components per 100 parts by mass of the tire puncture repair liquid is 16 parts by mass or more.

The coagulant (a coagulant of a second aspect of the present invention) of the present invention is a coagulant of a tire puncture repair liquid, the coagulant including a plant protein, a pectin, a cellulose, and a fatty acid glyceride, in which a mass ratio of the plant protein:the pectin:the cellulose:the fatty acid glyceride is 10 to 25:30 to 50:25 to 35:5 to 15, and a total quantity of the plant protein, the pectin, the cellulose and the fatty acid glyceride per 100 parts by mass of the tire puncture repair liquid is 8 parts by mass or more.

In the present specification, there are cases which refer to the coagulant of the present invention by combining the coagulant of the first aspect of the present invention and the coagulant of the second aspect of the present invention.

The present inventors discovered that the tire puncture repair liquid coagulates as a result of at least one component selected from the group consisting of a plant protein, a pectin, a cellulose, a phospholipid and a fatty acid glyceride, causing rubber particles and/or resin particles, which are dispersoid materials of an emulsion (including latex) that is included in the tire puncture repair liquid, to fuse together, or absorbing water and/or the anti-freezing agent that are included in the tire puncture repair liquid.

The present inventors assume that the plant protein and the pectin act in a manner that coagulates the rubber particles and/or the resin particles, that the cellulose acts in a manner that raises the viscosity of the tire puncture repair liquid, and that the fatty acid glyceride thickens the tire puncture repair liquid as a result of dissolving in the anti-freezing agent.

Furthermore, in a case in which the coagulant of the present invention further contains a metal salt, the inventors discovered that there is an effect of the metal salt causes the rubber particles and/or the resin particles to aggregate together, and be separated from the tire puncture repair liquid.

Additionally, the above-mentioned mechanism is an inference by the present inventors, the mechanism of the present invention still falls within the scope of the present invention even if it differs from that described above.

The coagulant (a coagulant of a first aspect of the present invention) of the present invention is a coagulant of a tire puncture repair liquid, the coagulant including at least one component selected from the group consisting of a plant protein, a pectin, a cellulose, a phospholipid and a fatty acid glyceride, in which a quantity of the components per 100 parts by mass of the tire puncture repair liquid is 16 parts by mass or more.

The plant protein is not particularly limited. Examples of the plant protein include fatty seed proteins derived from soybean protein, fermented soybeans protein, wheat protein, cotton, palm trees, rapeseed, safflower, cocoa, sunflower, sesame, soybeans, peas, potatoes, peanuts, and the like. Among these, soybean protein is preferable from a viewpoint of having excellent coagulability performance, and being readily available and inexpensive.

As long as the pectin is a water-soluble alimentary fiber, it is not particularly limited. The pectin may be a natural product or a synthesized product. Examples of a pectin derived from a natural product include pectin derived from apples, citrus plants, and soybeans. Among these, soybean pectin (soybean-derived pectin) is preferable from a viewpoint of having excellent coagulability performance, and being readily available and inexpensive.

As long as the cellulose is a polysaccharide, it is not particularly limited. In the present invention, cellulose derivatives are included in the meaning of the term cellulose. The cellulose (or the cellulose derivatives) may be water-insoluble or water-soluble.

Examples of the cellulose include cellulose and crystalline cellulose, and cellulose derivatives such as methyl cellulose, ethyl cellulose, methyl hydroxypropyl cellulose, hydroxyethyl cellulose, sodium cellulose sulfate, hydroxypropyl cellulose, carboxymethyl cellulose, and carboxymethyl cellulose sodium. Among these, cellulose is preferable from a viewpoint of having excellent coagulability performance and being inexpensive.

As long as the phospholipid is a lipid that has a phosphoric acid ester moiety in the structure thereof, it is not particularly limited. Examples of the phospholipid include glycerophospholipids such as phosphatidylcholine (lecithin), phosphatidylethanolamine, phosphatidylinositol, phosphatidylserine, phosphatidylglycerol, and diphosphatidylglycerol, and sphingophospholipids such as sphingomyelin. Among these, lecithin is preferable from a viewpoint of having excellent coagulability performance and chemical stability.

As long as the fatty acid glyceride is a fatty acid ester of glycerin, it is not particularly limited. Examples of the fatty acid glyceride include mono, di and triglycerides of glycerin and a fatty acid, and fatty acid esters of polyglycerin.

Examples of a fatty acid include acetic acid, citric acid, succinic acid, diacetyltartaric acid, lactic acid, palmitic acid, stearic acid, oleic acid, linoleic acid, linolenic acid, ricinoleic acid, and dihydroxy acid. The fatty acids may respectively be used independently or in a combination of two or more thereof.

Among these, a fatty acid triglyceride is preferable from a viewpoint of having excellent coagulability performance, and being readily available at an inexpensive price, and a triglyceride that is formed from one or two or more of any one of an oleic acid, a linoleic acid and a linolenic acid is preferable.

For example, it is possible to use castor oil, soybean oil or sunflower oil as a fatty acid glyceride. For example, as the fatty acids, the castor oil can include palmitic acid, stearic acid, oleic acid, linoleic acid, linolenic acid, ricinoleic acid and dihydroxy acid.

The plant proteins may respectively be used independently or in a combination of two or more thereof. The same applies to the pectin, the cellulose, the phospholipid and the fatty acid glyceride.

The coagulant of the first aspect of the present invention contains at least one component selected from the group consisting of a plant protein, a pectin, a cellulose, a phospholipid and a fatty acid glyceride. In a case in which the coagulant contains at least two substances selected from the corresponding group, the combination thereof is not particularly limited. A combination of a plant protein and a pectin, a combination of a protein and a cellulose, and a combination of a cellulose and a fatty acid glyceride are preferable from a viewpoint of having excellent coagulability performance, and being readily available at an inexpensive price. In addition, examples of preferable combinations include a combination of a plant protein, a pectin and a cellulose, a combination of a plant protein, a cellulose and a fatty acid glyceride, a combination of a pectin, a cellulose and a fatty acid glyceride, and a combination of a plant protein, a pectin, a cellulose and a fatty acid glyceride.

In a case in which the coagulant of the first aspect of the present invention contains two substances selected from the corresponding group, the quantitative ratio thereof is not particularly limited.

For example, in a case of a combination of a plant protein and a pectin, a mass ratio of a plant protein:a pectin is preferably 1:0.8 to 1:8 from a viewpoint of having excellent coagulability performance.

In a case of a combination of a plant protein and a cellulose, a mass ratio of a plant protein:a cellulose is preferably 1:0.5 to 1:4, and more preferably 1:0.5 to 1:2 from a viewpoint of having excellent coagulability performance, and being inexpensive.

In a case of a combination of a cellulose and a fatty acid glyceride, a mass ratio of a cellulose:a fatty acid glyceride is preferably 1:0.1 to 1:2, and more preferably 1:0.1 to 1:1 from a viewpoint of having excellent coagulability performance and being inexpensive.

In a case in which the coagulant of the first aspect of the present invention contains three substances selected from the corresponding group, the quantitative ratio thereof is not particularly limited.

For example, in a case of a combination of a plant protein, a pectin and a cellulose, a mass ratio of a plant protein:a pectin:a cellulose is preferably 1 to 2.5:1 to 5.5:0.8 to 5 from a viewpoint of having excellent coagulability performance.

In a case of a combination of a plant protein, a cellulose and a fatty acid glyceride, a mass ratio of a plant protein:a cellulose:a fatty acid glyceride is preferably 0.7 to 3:2 to 4:0.25 to 1.5 from a viewpoint of having excellent coagulability performance.

In a case of a combination of a pectin, a cellulose and a fatty acid glyceride, a mass ratio of a pectin:a cellulose:a fatty acid glyceride is preferably 0.7 to 6:0.5 to 4:0.5 to 2 from a viewpoint of having excellent coagulability performance.

In a case in which the coagulant of the first aspect of the present invention contains a plant protein, a pectin, a cellulose and a fatty acid glyceride, the quantitative ratio thereof is not particularly limited. A mass ratio of a plant protein:a pectin:a cellulose:a fatty acid glyceride is preferably 5 to 35:20 to 60:15 to 50:5 to 20, and more preferably 10 to 20:25 to 50:20 to 30:5 to 20 from a viewpoint of having excellent coagulability performance and excellent miscibility with the tire puncture repair liquid.

Additionally, in a case in which the coagulant of the first aspect of the present invention contains a plant protein, a pectin, a cellulose and a fatty acid glyceride, it is possible to exclude a coagulant in which a mass ratio of a plant protein:a pectin:a cellulose:a fatty acid glyceride is 10 to 25:30 to 50:25 to 35:5 to 15, from the first aspect.

More specifically, it is possible to set a mass ratio of a plant protein:a pectin:cellulose:a fatty acid glyceride to 5 to 9:20 to 60:15 to 50:5 to 20, 26 to 35:20 to 60:15 to 50:5 to 20, 5 to 35:51 to 60:15 to 50:5 to 20, 5 to 35:20 to 29:15 to 50:5 to 20, 5 to 35:20 to 60:15 to 24:5 to 20, 5 to 35:20 to 60:36 to 50:5 to 20, or 5 to 35:20 to 60:15 to 50:16 to 20.

The quantity of the phospholipid can be set to the total quantity of the coagulant or a portion thereof. In addition, in a case of using a phospholipid in combination with at least one substance selected from the group consisting of a plant protein, a pectin, a cellulose and a fatty acid glyceride, the quantity of the phospholipid is preferably 3 to 30 parts by mass per 100 parts by mass of the quantity of the at least one substance (a total quantity in a case of two or more substances) selected from the group consisting of a plant protein, a pectin, a cellulose and a fatty acid glyceride, and more preferably 5 to 20 parts by mass from a viewpoint of having excellent coagulability performance.

From a viewpoint of reducing a usage quantity in the corresponding coagulant of at least one substance selected from the group consisting of a plant protein, a pectin, a cellulose, a phospholipid, and a fatty acid glyceride, having excellent coagulability performance and being readily available at an inexpensive price, the coagulant of the first aspect of the present invention can further contain at least one metal salt selected from the group consisting of aluminum sulfate, calcium chloride, magnesium chloride and sodium chloride.

From a viewpoint of reducing a usage quantity in the corresponding coagulant of at least one of the above-mentioned substances, having excellent coagulability performance and being inexpensive, the quantity of the metal salt is preferably 5 to 20 mass % of the total quantity of the coagulant, and more preferably 10 to 20 mass %.

Examples of materials that can be used in the coagulant of the first aspect of the present invention include powders (for example, toasted soybean flour, wheat flour, or the like), extracts (for example, soy milk, sesame oil, or the like), extraction residues (for example, bean curd) of soybean, fermented soybeans, wheat, cotton, palm trees, rapeseed, safflower, cocoa, sunflower, sesame, peas, potatoes, peanuts, and the like, and dried products thereof.

In the coagulant of the first aspect of the present invention, the quantity of the at least one component (a total quantity in a case of two or more substances) selected from the group consisting of a plant protein, a pectin, a cellulose, a phospholipid, and a fatty acid glyceride, is 16 parts by mass or more per 100 parts by mass of the tire puncture repair liquid. From a viewpoint of having excellent coagulability performance, the quantity of the components is preferably 16 to 100 parts by mass per 100 parts by mass of the tire puncture repair liquid tire puncture repair liquid, and more preferably 16 to 40 parts by mass. The tire puncture repair liquid is not particularly limited.

From a viewpoint of having excellent coagulability performance, in a case in which the coagulant of the first aspect of the present invention is formed from the above-mentioned components only, the quantity of the components is preferably 16 to 100 parts by mass per 100 parts by mass of the tire puncture repair liquid, and more preferably 20 to 40 parts by mass.

From a viewpoint of having excellent coagulability performance, in a case in which the coagulant of the first aspect of the present invention contains a metal salt, the usage quantity of the corresponding coagulant is preferably 20 to 100 parts by mass per 100 parts by mass of the tire puncture repair liquid, and more preferably 20 to 40 parts by mass.

The coagulant of a second aspect of the present invention will be described below.

The coagulant of the second aspect of the present invention is a coagulant of a tire puncture repair liquid, the coagulant including a plant protein, a pectin, a cellulose, and a fatty acid glyceride, a mass ratio of the plant protein:the pectin:the cellulose:the fatty acid glyceride is 10 to 25:30 to 50:25 to 35:5 to 15, and a total quantity of the plant protein, the pectin, the cellulose and the fatty acid glyceride per 100 parts by mass of the tire puncture repair liquid is 8 parts by mass or more.

The plant protein, the pectin, the cellulose and the fatty acid glyceride that are used in the coagulant of the second aspect of the present invention are the same as the plant protein, the pectin, the cellulose and the fatty acid glyceride that are used in the coagulant of the first aspect of the present invention.

In the coagulant of the second aspect of the present invention, a mass ratio of the plant protein:the pectin:the cellulose:the fatty acid glyceride is 10 to 25:30 to 50:25 to 35:5 to 15. These quantitative ratios is preferably 10 to 25:30 to 45:30 to 35:5 to 10 from a viewpoint of having excellent coagulability performance and excellent miscibility with the tire puncture repair liquid.

From a viewpoint of having excellent coagulability performance and miscibility with the tire puncture repair liquid, the coagulant of the second aspect of the present invention can further contain a phospholipid. The phospholipid is the same as the phospholipid that is used in the coagulant of the first aspect of the present invention. Among these, lecithin is preferable from a viewpoint of having excellent coagulability performance and being readily available at an inexpensive price.

From a viewpoint of having excellent coagulability performance, the quantity of the phospholipid is preferably 3 to 70 parts by mass per 100 parts by mass of the total of the plant protein, the pectin, the cellulose and the fatty acid glyceride, and more preferably 5 to 50 parts by mass.

From a viewpoint of reducing a total usage quantity in the corresponding coagulant of the plant protein, the pectin, the cellulose and the fatty acid glyceride, having excellent coagulability performance and excellent miscibility with the tire puncture repair liquid, the coagulant of the second aspect of the present invention can further contain at least one metal salt selected from the group consisting of aluminum sulfate, calcium chloride, magnesium chloride and sodium chloride.

From a viewpoint of reducing a total usage quantity in the corresponding coagulant of the plant protein, the pectin, the cellulose and the fatty acid glyceride, having excellent coagulability performance and excellent miscibility with the tire puncture repair liquid, the quantity of the metal salt is preferably 5 to 20 mass % of the total quantity of the coagulant, and more preferably 10 to 20 mass %.

Examples of materials that can be used in the coagulant of the second aspect of the present invention include powders (for example, toasted soybean flour, wheat flour, or the like), extracts (for example, soy milk, sesame oil, or the like), extraction residues (for example, bean curd) of soybean, natto, wheat, cotton, palm trees, rapeseed, safflower, cocoa, sunflower, sesame, peas, potatoes, peanuts, and the like, and dried products thereof.

In the second aspect of the present invention, the total quantity of the plant protein, the pectin, the cellulose and the fatty acid glyceride per 100 parts by mass of the tire puncture repair liquid is 8 parts by mass or more. From a viewpoint of having excellent coagulability performance, the total quantity of these four components is preferably 8 to 100 parts by mass per 100 parts by mass of the tire puncture repair liquid, and more preferably 10 to 50 parts by mass. The tire puncture repair liquid is not particularly limited.

From a viewpoint of having excellent coagulability performance, in a case in which the coagulant of the second aspect of the present invention is formed from the above-mentioned components only, the total quantity of the four components is preferably 8 to 100 parts by mass per 100 parts by mass of the tire puncture repair liquid, and more preferably 10 to 50 parts by mass.

From a viewpoint of having excellent coagulability performance, in a case in which the coagulant of the second aspect of the present invention further contains a metal salt, the usage quantity of the corresponding coagulant is preferably 10 to 100 parts by mass per 100 parts by mass of the tire puncture repair liquid, and more preferably 10 to 50 parts by mass.

In addition to the above, the coagulant (the first aspect or the second aspect) of the present invention can contain as desired when necessary, additives such as, an anti-aging agent, an antioxidant, a pigment (a dye), a plasticizer, a thixotropic agent, a UV absorbent, a flame retardant, a surfactant (including a leveling agent), a dispersant, a dehydrating agent, an antistatic agent, and the like.

The production of the coagulant (the first aspect or the second aspect) of the present invention is not particularly limited. For example, it is possible to produce the coagulants by uniformly mixing the above-mentioned essential components and additives that may be used as necessary.

The coagulant (the first aspect or the second aspect) of the present invention can be used to coagulate a tire puncture repair liquid.

The form of the coagulant (the first aspect or the second aspect) of the present invention is not particularly limited. For example, an aspect in which the coagulant of the present invention is packaged in a batch is possible. Examples of packaging in a batch include a single-package type in which all components are contained in a single package, and a set type in which the components are individually contained in two or more packages and the two or more packages form a single set.

In a case in which additives are used in a set type, the additives may be added to any of the packages.

The usage method of the coagulant (the first aspect or the second aspect) of the present invention is not particularly limited. Examples include a method in which the coagulant of the present invention is added to a used tire puncture repair liquid. More specifically, for example, it is possible to coagulate the tire puncture repair liquid rapidly by adding the coagulant of the present invention to tire puncture repair liquid extracted from inside a tire or adding the coagulant inside a tire in which tire puncture repair liquid is used, and mixing the coagulant and the tire puncture repair liquid. After coagulation, the tire puncture repair liquid is easy to handle, because it becomes substantially solid. In addition, it is possible to easily dispose of the tire puncture repair liquid after coagulation.

The tire puncture repair kit of the present invention will be described below.

The tire puncture repair kit of the present invention is a tire puncture repair kit that includes a tire puncture repair liquid and the coagulant of the present invention.

The tire puncture repair liquid of the tire puncture repair kit of the present invention is not particularly limited. Examples include tire puncture repair liquids that contain an emulsion. In the present invention, the term emulsion (including latex) refers to a system in which one of two liquid phases that do not mix with one other is dispersed as fine particles in the other phase. In the present invention, an example of a preferable aspect of the tire puncture repair liquid contains at least water as a dispersion medium and contains a rubber and/or a resin as a dispersoid.

Examples of the emulsion contained in the tire puncture repair liquid include a natural rubber latex, a synthetic rubber latex, and a synthetic resin emulsion.

The natural rubber latex used in the tire puncture repair liquid is not particularly limited.

The synthetic rubber latex is not particularly limited, and examples thereof include conventionally known products. Specific examples include latexes of synthetic rubbers such as styrene-butadiene rubber (SBR), acrylonitrile-butadiene rubber (NBR), and chloroprene rubber (CR).

The synthetic resin emulsion used in the tire puncture repair liquid is not particularly limited, and examples thereof include conventionally known products. Examples of the synthetic resin emulsion include emulsions of synthetic resins such as urethane resins, (meth)acrylic resins, polyolefin resins, ethylene-vinyl acetate-based copolymers (in addition to ethylene vinyl acetate copolymers, the ethylene vinyl acetate-based copolymers include, for example, ethylene vinyl acetate vinyl versatate copolymers), polyvinyl acetate, and polyvinyl chloride.

The production of the emulsion is not particularly limited. Examples thereof include conventionally known methods. One type of emulsion may be used independently, or two or more may be used in combination.

Among these, ethylene vinyl acetate emulsion, natural rubber latex, and SBR latex are preferred from a viewpoint of being readily available and inexpensive.

The tire puncture repair liquid used in the tire puncture repair kit of the present invention may further contain an anti-freezing agent. The antifreezing agent preferably comprises at least one substance selected from the group consisting of ethylene glycol, propylene glycol, diethylene glycol and glycerin from a viewpoint of having an excellent effect of reducing the coagulation point.

The quantity of the anti-freezing agent is preferably 70 to 1200 parts by mass, more preferably 100 to 1000 parts by mass, still more preferably 120 to 900 parts by mass, and particularly preferably 140 to 800 parts by mass per 100 parts by mass of solid content of the emulsion that is included in the tire puncture repair liquid from a viewpoint of having excellent performance in preventing the freezing of the tire puncture sealing liquid.

The tire puncture repair liquid used in the tire puncture repair kit of the present invention preferably further contains a tackifier from a viewpoint of obtaining excellent sealability. Examples of the tackifier include rosin-based resins such as rosin resins, polymerized rosin resins, rosin ester resins, polymerized rosin ester resins, modified rosins, and the like; terpene phenol resins; terpene resins such as aromatic terpenes and the like; hydrogenated terpene resins (terpene resins to which hydrogen has been added); phenolic resins; xylene resins; and the like.

In addition, from a viewpoint of having excellent compatibility with the emulsion contained in the tire puncture repair liquid, an example of a preferable aspect of the tackifier is an emulsion obtained by emulsifying these resins. The tackifier may be used independently, or two or more types thereof may be used in combination.

The solid content of the tackifier is preferably 50 to 200 parts by mass, more preferably 70 to 200 parts by mass, and still more preferably 80 to 180 parts by mass per 100 parts by mass of the total solid content of the emulsion that is included in the tire puncture repair liquid from a viewpoint of having excellent sealability.

In addition to the above components, the tire puncture repair liquid can include as desired when necessary, additives such as an anti-aging agent, an antioxidant, a pigment (a dye), a plasticizer, a thixotropic agent, a UV absorbent, a flame retardant, a surfactant (including a leveling agent), a dispersant, a dehydrating agent, an antistatic agent, and the like.

An example of a preferable aspect of the tire puncture repair liquid includes a natural rubber latex and/or an ethylene-vinyl acetate copolymer emulsion, and an anti-freezing agent.

In the present invention, the quantity of water in the tire puncture repair liquid can be 20 to 50 mass % of the total of the tire puncture repair liquid.

The production method of the tire puncture repair liquid used in the tire puncture repair kit of the present invention is not particularly limited. Examples thereof include a method in which the emulsion, and the anti-freezing agent, the tackifier, and additives that can be used according to necessity are placed in a reaction vessel and sufficiently kneaded under reduced pressure using a mixer such as a combination mixer or the like. A commercially available product can be used as the tire puncture repair liquid.

The form of the tire puncture repair kit of the present invention is not particularly limited. For example, the tire puncture repair liquid and the coagulant may be in the same package (a set).

The tire puncture repair kit of the present invention can be used as a tire puncture emergency repair kit.

EXAMPLES

The present invention is described below in detail using working examples. However, the present invention is not limited to these examples.

Production of Tire Puncture Repair Liquid

The tire puncture repair liquid was produced by mixing 30 parts by mass of a natural rubber latex (HA Latex, solid content 60 mass %, Golden Hope Co. Ltd.), 40 parts by mass of an ethylene-vinyl acetate copolymer emulsion (EVA emulsion, solid content 51 mass %, Sumikaflex S-408HQE, Sumika Chemtex Corp.), and 30 parts by mass of propylene glycol (Wako Pure Chemical Industries, Ltd.) as the anti-freezing agent.

Production of Coagulant

The coagulant was produced using the quantities (unit: parts by mass) shown in Table 1 of the components listed in the table. The components used in the coagulant were mixed in cases in which two or more components were used.

TABLE 1

|  | Blending Examples | | | | | | | | | | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 |
| Plant protein | 1.5 | 1 | 2.5 | 2.5 | 1.3 | 2.5 | 2.5 | 3 | 0.7 | 1 | 10 | 10 |  | 1.5 | 10 |
| Pectin | 4 | 5 | 3 | 3.5 | 5 | 5 | 5 | 2.5 | 5.3 | 3.5 | 10 | 10 | 10 | 4 | 10 |
| Cellulose | 3.5 | 2.5 | 3.5 | 3.5 | 2.5 | 2.5 | 2 | 3 | 2.5 | 3.8 | 5 |  | 10 | 3.5 | 5 |
| Fatty acid glyceride | 1 | 1.5 | 1 | 0.5 | 1.2 |  | 0.5 | 1.5 | 1.5 | 1.7 |  | 5 | 5 | 1 |  |
| Phospholipid |  |  |  |  |  |  |  |  |  |  |  |  |  | 5 | 5 |
| Total | 10 | 10 | 10 | 10 | 10 | 10 | 10 | 10 | 10 | 10 | 25 | 25 | 25 | 15 | 30 |

Details of the components listed in Table 1 are as follows.

Plant protein: Reagent, soybean peptide (soybean-derived protein powder), manufactured by Wako Pure Chemical Industries, Ltd.

Pectin: Reagent, soybean-derived pectin, manufactured by Wako Pure Chemical Industries, Ltd.

Cellulose: Reagent, cellulose, manufactured by Wako Pure Chemical Industries, Ltd.

Fatty acid glyceride: Fatty acid triglyceride (fatty acid: palmitic acid, stearic acid, oleic acid, linoleic acid, linolenic acid, ricinoleic acid, dihydroxy acid), castor oil product 1, manufactured by Itoh Oil Chemicals Co., Ltd.

Phospholipid: Lecithin, manufactured by Wako Pure Chemical Industries, Ltd.

Evaluation

Coagulability performance was evaluated in the following manner using coagulants produced in the above-mentioned manner. The results thereof are shown in Tables 2 and 3.

The coagulants produced in the above-mentioned manner were used in the quantities (unit: parts by mass) shown in Tables 2 and 3 with respect to 100 parts by mass of the tire puncture repair liquid produced as mentioned above. After the two were mixed, the state of the coagulation of the obtained mixed liquids was observed under a condition at 20° C.

As a result of these observations, cases in which the mixed liquids coagulated within 30 minutes were evaluated as "Superior" for which the coagulability performance of the coagulant is particularly excellent, cases in which the coagulation time exceeded 30 minutes but was within 60 minutes were evaluated as "Excellent" for which the coagulability performance is excellent, cases in which the coagulation time exceeded 60 minutes but was within 12 hours were evaluated as "Good" for which the coagulability performance is favorable, and cases in which the coagulation time exceeded 12 hours were evaluated as "Poor" for which the coagulability performance is low.

TABLE 2

| Working Examples I | 1 | 2 | 3 |  | 4 | 5 |  | 6 |  |
|---|---|---|---|---|---|---|---|---|---|
| Comparative Examples I |  |  |  | 1 |  |  | 2 |  | 3 |
| Blending examples of Table 1 | 1 | 1 | 1 | 1 | 2 | 2 | 2 | 3 | 3 |
| Addition amount of the coagulant in blending examples of Table 1 per 100 parts by mass of puncture repair liquid (parts by mass) | 5 | 10 | 15 | 20 | 5 | 15 | 20 | 5 | 15 |
| Aluminum sulfate |  |  |  |  |  |  |  |  |  |
| Calcium chloride |  |  |  |  |  |  |  |  |  |
| Magnesium chloride |  |  |  |  |  |  |  |  |  |
| Sodium chloride |  |  |  |  |  |  |  |  |  |
| Coagulability Performance | Poor | Excellent | Superior | Superior | Poor | Excellent | Superior | Poor | Excellent |

| Working Examples I | 7 |  | 8 | 9 |  | 10 | 11 |
|---|---|---|---|---|---|---|---|
| Comparative Examples I |  | 4 |  |  | 5 |  |  |
| Blending examples of Table 1 | 3 | 4 | 4 | 4 | 5 | 5 | 5 |
| Addition amount of the coagulant in blending examples of Table 1 per 100 parts by mass of puncture repair liquid (parts by mass) | 20 | 5 | 15 | 20 | 5 | 15 | 20 |
| Aluminum sulfate |  |  |  |  |  |  |  |
| Calcium chloride |  |  |  |  |  |  |  |
| Magnesium chloride |  |  |  |  |  |  |  |
| Sodium chloride |  |  |  |  |  |  |  |
| Coagulability Performance | Superior | Poor | Excellent | Superior | Poor | Excellent | Superior |

| Working Examples I | 12 | 13 | 14 |  | 15 | 16 | 17 |  | 18 |
|---|---|---|---|---|---|---|---|---|---|
| Comparative Examples I |  |  |  | 6 |  |  |  | 7 |  |
| Blending examples of Table 1 |  |  |  | 1 |  |  |  |  |  |
| Addition amount of the coagulant in blending examples of Table 1 per 100 parts by mass of puncture repair liquid (parts by mass) | 9.3 | 9 | 8 | 7 | 9.3 | 9 | 8 | 7 | 9.3 |
| Aluminum sulfate | 0.7 | 1 | 2 | 3 |  |  |  |  |  |
| Calcium chloride |  |  |  |  | 0.7 | 1 | 2 | 3 |  |
| Magnesium chloride |  |  |  |  |  |  |  |  | 0.7 |
| Sodium chloride |  |  |  |  |  |  |  |  |  |
| Coagulability Performance | Excellent | Superior | Good | Poor | Excellent | Superior | Good | Poor | Excellent |

| Working Examples I | 19 | 20 |  | 21 | 22 | 23 |  | 24 |
|---|---|---|---|---|---|---|---|---|
| Comparative Examples I |  |  | 8 |  |  |  | 9 |  |
| Blending examples of Table 1 |  |  |  | 1 |  |  |  | 14 |
| Addition amount of the coagulant in blending examples of Table 1 per 100 parts by mass of puncture repair liquid (parts by mass) | 9 | 8 | 7 | 9.3 | 9 | 8 | 7 | 15 |

TABLE 2-continued

| | | | | | | | | |
|---|---|---|---|---|---|---|---|---|
| Aluminum sulfate | | | | | | | | 2 |
| Calcium chloride | | | | | | | | |
| Magnesium chloride | 1 | 2 | 3 | | | | | |
| Sodium chloride | | | | 0.7 | 1 | 2 | 3 | |
| Coagulability Performance | Excellent | Good | Poor | Good | Excellent | Good | Poor | Superior |

TABLE 3

| | | | | | | | | |
|---|---|---|---|---|---|---|---|---|
| Working Examples II | | 1 | 2 | | 3 | 4 | | 5 |
| Comparative Examples II | 1 | | | 2 | | | 3 | |
| Blending examples of Table 1 | 6 | 6 | 6 | 7 | 7 | 7 | 8 | 8 |
| Addition amount of the coagulant in blending examples of Table 1 per 100 parts by mass of puncture repair liquid (parts by mass) | 15 | 20 | 30 | 15 | 20 | 30 | 15 | 20 |
| Aluminum sulfate | | | | | | | | |
| Calcium chloride | | | | | | | | |
| Magnesium chloride | | | | | | | | |
| Sodium chloride | | | | | | | | |
| Coagulability Performance | Poor | Excellent | Excellent | Poor | Excellent | Excellent | Poor | Excellent |

| | | | | | | | |
|---|---|---|---|---|---|---|---|
| Working Examples II | 6 | | 7 | 8 | | 9 | 10 |
| Comparative Examples II | | 4 | | | 5 | | |
| Blending examples of Table 1 | 8 | 9 | 9 | 9 | 10 | 10 | 10 |
| Addition amount of the coagulant in blending examples of Table 1 per 100 parts by mass of puncture repair liquid (parts by mass) | 30 | 15 | 20 | 30 | 15 | 20 | 30 |
| Aluminum sulfate | | | | | | | |
| Calcium chloride | | | | | | | |
| Magnesium chloride | | | | | | | |
| Sodium chloride | | | | | | | |
| Coagulability Performance | Excellent | Poor | Excellent | Excellent | Poor | Excellent | Excellent |

| | | | | | | | | | | |
|---|---|---|---|---|---|---|---|---|---|---|
| Working Examples II | 11 | 12 | 13 | 14 | | 15 | 16 | 17 | 18 | |
| Comparative Examples II | | | | | 6 | | | | | 7 |
| Blending examples of Table 1 | 11 | 11 | 11 | 11 | 11 | 12 | 12 | 12 | 12 | 12 |
| Addition amount of the coagulant in blending examples of Table 1 per 100 parts by mass of puncture repair liquid (parts by mass) | 20 | 18.6 | 18 | 16 | 14 | 20 | 18.6 | 18 | 16 | 14 |
| Aluminum sulfate | | 1.4 | 2 | 4 | 6 | | 1.4 | 2 | 4 | 6 |
| Calcium chloride | | | | | | | | | | |
| Magnesium chloride | | | | | | | | | | |
| Sodium chloride | | | | | | | | | | |
| Coagulability Performance | Excellent | Superior | Superior | Good | Poor | Excellent | Superior | Good | Good | Poor |

| | | | | | | | | | | |
|---|---|---|---|---|---|---|---|---|---|---|
| Working Examples II | 19 | 20 | 21 | 22 | | 23 | 24 | 25 | 26 | |
| Comparative Examples II | | | | | 8 | | | | | 9 |
| Blending examples of Table 1 | 13 | 13 | 13 | 13 | 13 | 15 | 15 | 15 | 15 | 15 |
| Addition amount of the coagulant in blending examples of Table 1 | 20 | 18.6 | 18 | 16 | 14 | 20 | 18.6 | 18 | 16 | 14 |

TABLE 3-continued

| Table 1 per 100 parts by mass of puncture repair liquid (parts by mass) | | | | | | | | | | |
|---|---|---|---|---|---|---|---|---|---|---|
| Aluminum sulfate | | | | | | | | | | |
| Calcium chloride | | | | | | | | | | |
| Magnesium chloride | | 1.4 | 2 | 4 | 6 | | | | | |
| Sodium chloride | | | | | | | 1.4 | 2 | 4 | 6 |
| Coagulability Performance | Excellent | Superior | Good | Good | Poor | Excellent | Superior | Superior | Good | Poor |

The details of the metal salts such as aluminum sulfate that are shown in Tables 2 and 3 are as follows.

Aluminum sulfate: Reagent, Manufactured by Wako Pure Chemical Industries, Ltd.

Calcium chloride: Reagent, Manufactured by Wako Pure Chemical Industries, Ltd.

Magnesium chloride: Reagent, Manufactured by Wako Pure Chemical Industries, Ltd.

Sodium chloride: Reagent, Manufactured by Wako Pure Chemical Industries, Ltd.

As is evident from the results shown in Table 2, in cases in which the coagulant contained specific quantities of the plant protein, the pectin, the cellulose and the fatty acid glyceride, the coagulability performance was low in Comparative Examples I-1 to 9 in which the total quantity of the four components was less than 8 parts by mass per 100 parts by mass of the tire puncture repair liquid.

In contrast to this, the coagulability performance was excellent in Working Examples I-1 to 24.

In addition, when Working Examples I-1, 12 to 14 and 15 to 17 are compared, in cases in which a specific quantity of a metal salt was used, it was possible to reduce the total quantity of the plant protein, the pectin, the cellulose and the fatty acid glyceride, and to obtain superior coagulability performance.

As is evident from the results shown in Table 3, in cases in which the coagulant contains specific quantities of at least one component selected from the group consisting of the plant protein, the pectin, the cellulose and the fatty acid glyceride, the coagulability performance was low in Comparative Examples II-1 to 9 in which the quantity of the corresponding components was less than 16 parts by mass per 100 parts by mass of the tire puncture repair liquid.

In contrast to this, the coagulability performance was excellent in Working Examples II-1 to 26.

In addition, when Working Examples II-11 to 14, 15 to 18, 19 to 22 and 23 to 26 are compared, in cases in which a specific quantity of a metal salt was used, it was possible to reduce the quantity of the above-mentioned components, and to obtain superior coagulability performance.

The invention claimed is:

1. A coagulant of a tire puncture repair liquid, the coagulant comprising at least one component selected from the group consisting of a plant protein, a pectin, a cellulose, a phospholipid and a fatty acid glyceride, a quantity of the components per 100 parts by mass of the tire puncture repair liquid being 16 parts by mass or more, and at least one metal salt selected from the group consisting of aluminum sulfate, calcium chloride, magnesium chloride and sodium chloride.

2. A coagulant of a tire puncture repair liquid, the coagulant comprising:

a plant protein;
a pectin;
a cellulose; and
a fatty acid glyceride,
a mass ratio of the plant protein:the pectin:the cellulose:the fatty acid glyceride being 10 to 25:30 to 50:25 to 35:5 to 15, and
a total quantity of the plant protein, the pectin, the cellulose and the fatty acid glyceride per 100 parts by mass of the tire puncture repair liquid being 8 parts by mass or more.

3. The coagulant according to claim 2, further comprising a phospholipid.

4. The coagulant according to claim 1, wherein the fatty acid glyceride is a fatty acid triglyceride.

5. The coagulant according to claim 1, wherein a quantity of the metal salt is 5 to 20 mass % of the total quantity of the coagulant.

6. The coagulant according to claim 1, wherein the tire puncture repair liquid contains at least one selected from the group consisting of a natural rubber latex and an ethylene-vinyl acetate copolymer emulsion, and an anti-freezing agent.

7. The coagulant according to claim 6, wherein the anti-freezing agent is at least one substance selected from the group consisting of ethylene glycol, propylene glycol, diethylene glycol and glycerin.

8. A tire puncture repair kit comprising:
a tire puncture repair liquid; and
the coagulant descried in claim 1.

9. The coagulant according to claim 2, wherein the fatty acid glyceride is a fatty acid triglyceride.

10. The coagulant according to claim 2, further comprising at least one metal salt selected from the group consisting of aluminum sulfate, calcium chloride, magnesium chloride and sodium chloride.

11. The coagulant according to claim 10, wherein a quantity of the metal salt is 5 to 20 mass % of the total quantity of the coagulant.

12. The coagulant according to claim 2, wherein the tire puncture repair liquid contains at least one selected from the group consisting of a natural rubber latex and an ethylene-vinyl acetate copolymer emulsion, and an anti-freezing agent.

13. The coagulant according to claim 12, wherein the anti-freezing agent is at least one substance selected from the group consisting of ethylene glycol, propylene glycol, diethylene glycol and glycerin.

14. A tire puncture repair kit comprising:
a tire puncture repair liquid; and
the coagulant described in claim 2.

* * * * *